United States Patent
Kuebler et al.

(10) Patent No.: US 6,850,699 B2
(45) Date of Patent: Feb. 1, 2005

(54) FLUID HEATER TEMPERATURE CONTROL APPARATUS AND METHOD

(75) Inventors: Karl-Heinz Kuebler, Grand Blanc, MI (US); Daryl G. Harris, Oxford, MI (US); Mark M. Benner, Lake Orion, MI (US); Lee A. Bissonnette, Clarkston, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/377,340

(22) Filed: Feb. 28, 2003

(65) Prior Publication Data

US 2004/0170411 A1 Sep. 2, 2004

(51) Int. Cl.[7] .................................................. F24H 1/10
(52) U.S. Cl. ........................................ 392/484; 392/466
(58) Field of Search ................................ 392/465–484, 392/497, 498

(56) References Cited

U.S. PATENT DOCUMENTS

| | | | |
|---|---|---|---|
| 653,629 A | 7/1900 | Schneider | |
| 941,215 A | 11/1909 | Wade | |
| 1,523,156 A | 7/1925 | Adams | |
| 1,636,190 A | 7/1927 | Mattoney | |
| 2,833,909 A | 5/1958 | Levey | 219/39 |
| 3,014,251 A | 12/1961 | Sstern | 20/40.5 |
| 3,202,447 A | 8/1965 | Whaley | 294/87.2 |
| 3,292,866 A | 12/1966 | Benner | 239/284 |
| 3,332,045 A | 7/1967 | Redaway | 335/81 |
| 3,338,476 A | 8/1967 | Marcoux | 222/146 |
| 3,427,675 A | 2/1969 | Tibbat | |
| 3,489,884 A | 1/1970 | Wasekeski | 219/522 |
| 3,553,428 A | 1/1971 | McGhee | 219/494 |

(List continued on next page.)

FOREIGN PATENT DOCUMENTS

| | | |
|---|---|---|
| AU | 222081 | 11/1957 |
| CA | 1216713 | 1/1987 |
| CA | 2133592 | 4/1995 |
| CA | 2176539 | 11/1997 |
| DE | 854 403 | 11/1952 |
| DE | 23 53 738 | 9/1980 |
| DE | 3430 653 | 8/1984 |
| DE | 3 507 900 | 11/1986 |
| DE | 35 26 430 | 5/1987 |
| DE | 39 07 968 | 9/1990 |
| DE | 19820220 | 11/1999 |
| DE | 19935134 | 1/2001 |
| EP | 1 006 029 | 11/1999 |
| EP | 1 006 030 | 11/1999 |
| EP | 1 213 197 | 12/2000 |
| EP | 1162118 | 12/2001 |
| FR | 2 585 311 | 1/1987 |
| FR | 2 605 273 | 4/1988 |
| FR | 2 609 437 | 7/1988 |
| FR | 2 677 939 | 12/1992 |
| FR | 2 707 230 | 7/1993 |
| GB | 370687 | 5/1931 |
| GB | 1 318 498 | 5/1973 |
| GB | 1 451 666 | 10/1974 |
| GB | 2 044 601 | 10/1980 |

(List continued on next page.)

*Primary Examiner*—Thor S. Campbell
(74) *Attorney, Agent, or Firm*—J. Gordon Lewis (57) ABSTRACT

A method and apparatus for controlling fluid temperature in a fluid heater apparatus which supplies heat to fluid from a controllable heater element(s) which includes establishing a discharge temperature range between a first high temperature and a second low temperature. The temperature of the fluid is measured and, in response to the measured temperature, activation of the heater elements is controlled to maintain the temperature of the fluid within the temperature range. The heater elements can be independently controllable for temperature control.

9 Claims, 7 Drawing Sheets

U.S. PATENT DOCUMENTS

| | | | |
|---|---|---|---|
| 3,632,042 A | 1/1972 | Goulish | 239/130 |
| 3,668,757 A | 6/1972 | Rieden | 29/157.3 |
| 3,716,886 A | 2/1973 | Klomp | 15/250.04 |
| 3,756,510 A | 9/1973 | Nitterl | 239/129 |
| 3,785,359 A | 1/1974 | Whittaker | 126/19.5 |
| 3,888,412 A | 6/1975 | Lundo | 237/12.3 B |
| 3,891,827 A | 6/1975 | Wyse | 219/302 |
| 3,977,436 A | 8/1976 | Larner | 137/625.65 |
| 3,979,068 A | 9/1976 | Applebaum | 239/284 R |
| 4,090,668 A | 5/1978 | Kochenour | 239/130 |
| 4,106,508 A | 8/1978 | Berlin | 128/346 |
| 4,159,026 A | 6/1979 | Williamson | 137/625.5 |
| 4,177,375 A | 12/1979 | Meixner | 219/441 |
| 4,212,425 A | 7/1980 | Schlick | 239/133 |
| 4,248,383 A | 2/1981 | Savage | 239/284 |
| 4,253,493 A | 3/1981 | English | 137/625.18 |
| 4,295,111 A | 10/1981 | Frosch | 335/256 |
| 4,295,769 A | 10/1981 | Douthett | 411/411 |
| 4,306,589 A | 12/1981 | Harned | 137/625.65 |
| 4,343,988 A * | 8/1982 | Roller et al. | 392/467 |
| 4,358,652 A | 11/1982 | Kaarup | 219/10.55 |
| 4,403,756 A | 9/1983 | Berlin | 244/223 |
| 4,417,116 A | 11/1983 | Black | |
| 4,430,994 A | 2/1984 | Clawson | 128/203.27 |
| 4,489,863 A | 12/1984 | Horchos | 222/504 |
| 4,508,957 A * | 4/1985 | Rocchitelli | 392/479 |
| 4,524,797 A | 6/1985 | Lungu | 137/343 |
| 4,534,539 A | 8/1985 | Dettmann | 251/65 |
| 4,561,632 A | 12/1985 | Hugler | 251/129.15 |
| 4,574,841 A | 3/1986 | Hugler | 137/625.44 |
| 4,589,374 A | 5/1986 | Farina | 122/14 |
| 4,669,430 A | 6/1987 | Reinold | 123/179 |
| 4,689,548 A | 8/1987 | Mechlenburg | 323/243 |
| 4,690,371 A | 9/1987 | Bosley | 251/65 |
| 4,832,262 A | 5/1989 | Robertson | 239/129 |
| 4,858,576 A | 8/1989 | Jeffries | 123/145 |
| 4,877,186 A | 10/1989 | Scholl | 239/75 |
| 4,894,520 A | 1/1990 | Moran | 219/497 |
| 4,905,904 A | 3/1990 | Ohara | 239/284.1 |
| 4,927,060 A | 5/1990 | Snowball | 222/146.5 |
| 4,975,630 A | 12/1990 | Ma | 323/300 |
| 5,012,977 A | 5/1991 | Karklins | 239/284.1 |
| 5,074,471 A | 12/1991 | Baumgarten | 239/284.1 |
| 5,118,040 A | 6/1992 | Abe | 239/284.1 |
| 5,168,595 A | 12/1992 | Naylor, Jr. | 15/250.4 |
| 5,180,896 A | 1/1993 | Gibby | 219/10.55 |
| 5,183,099 A | 2/1993 | Bechu | 165/41 |
| 5,203,049 A | 4/1993 | Nogawa | 15/250.02 |
| 5,247,148 A | 9/1993 | Mencher | 219/10.55 |
| 5,249,623 A | 10/1993 | Miller | 165/156 |
| 5,254,083 A | 10/1993 | Gentelia | 604/35 |
| 5,280,806 A | 1/1994 | Glazebrook | 137/517 |
| 5,289,698 A | 3/1994 | Garimella | 62/498 |
| 5,318,071 A | 6/1994 | Gaiardo | 137/625.65 |
| 5,345,968 A | 9/1994 | Day | 137/625.46 |
| 5,351,934 A | 10/1994 | Jensen | 251/65 |
| 5,354,965 A | 10/1994 | Lee | 219/202 |
| 5,369,247 A | 11/1994 | Doljack | 219/485 |
| 5,383,247 A | 1/1995 | Nickel | 15/250.04 |
| 5,421,727 A | 6/1995 | Stevens | |
| 5,428,206 A | 6/1995 | Uchida | 219/505 |
| 5,433,382 A | 7/1995 | Baumgarten | 239/284.1 |
| 5,509,606 A | 4/1996 | Breithaupt | 239/130 |
| 5,598,502 A | 1/1997 | Takahashi | 392/502 |
| 5,636,407 A | 6/1997 | Len | 15/250.19 |
| 5,673,360 A | 9/1997 | Scripps | 392/405 |
| 5,676,868 A | 10/1997 | Simmons | 219/202 |
| 5,727,769 A | 3/1998 | Suzuki | 251/129.15 |
| 5,784,751 A | 7/1998 | Tippets | 15/250.04 |
| 5,881,428 A | 3/1999 | Simmons | 15/250.04 |
| 5,927,608 A | 7/1999 | Scorsiroli | 239/284.1 |
| 5,947,348 A | 9/1999 | Briski | 222/640 |
| 5,957,384 A | 9/1999 | Lansinger | 239/284.1 |
| 5,979,796 A | 11/1999 | Ponziani | 239/284.1 |
| 5,988,529 A | 11/1999 | Suhring | 239/284.1 |
| 6,009,369 A | 12/1999 | Boisvert | 701/99 |
| 6,029,908 A | 2/2000 | Petzold | 239/284.1 |
| 6,032,324 A | 3/2000 | Lansinger | 15/250.04 |
| 6,119,300 A | 9/2000 | Schmid | 15/250.04 |
| 6,133,546 A | 10/2000 | Bains | 219/202 |
| 6,148,258 A | 11/2000 | Boisvert | 701/99 |
| 6,164,564 A | 12/2000 | Franco et al. | 239/284.1 |
| 6,199,587 B1 | 3/2001 | Shlomi | 137/625.5 |
| 6,236,019 B1 | 5/2001 | Piccione | 219/203 |
| 6,247,653 B1 | 6/2001 | Seyfarth | 239/284.1 |
| 6,257,500 B1 | 7/2001 | Petzold | 239/284.1 |
| 6,260,608 B1 | 7/2001 | Kim | 165/41 |
| 6,271,506 B1 | 8/2001 | Glaser | 219/505 |

FOREIGN PATENT DOCUMENTS

| | | |
|---|---|---|
| GB | 2 121 681 | 1/1984 |
| GB | 2 255 096 | 5/1990 |
| GB | 2 260 399 | 4/1993 |
| GB | 2 271 276 | 4/1994 |
| GB | 2 271 712 | 4/1994 |
| GB | 2 290 461 | 1/1996 |
| GB | 2 308 971 | 7/1997 |
| GB | 2 310 795 | 9/1997 |
| GB | 2 331 231 | 5/1999 |
| GB | 2354 688 | 11/2000 |
| GB | 2 350 555 | 12/2000 |
| JP | 63-93652 | 4/1988 |
| JP | 2053656 | 2/1990 |
| JP | 2234866 | 9/1990 |
| JP | 4-38248 | 2/1992 |
| JP | 8312824 | 11/1996 |
| US | 2002/0040895 | 4/2002 |
| US | 2002/0137455 | 9/2002 |
| WO | WO 9746431 | 12/1997 |
| WO | WO 98/49036 | 11/1998 |
| WO | WO 98/58826 | 12/1998 |
| WO | WO 99/56993 | 11/1999 |
| WO | WO 00/04754 | 2/2000 |
| WO | WO 00/27540 | 5/2000 |
| WO | WO 02/92237 | 11/2002 |

* cited by examiner

FLUID HEATER TEMPERATURE CONTROL APPARATUS AND METHOD

BACKGROUND

This invention relates, in general, to fluid heater apparatus and, more particularly, to fluid heater apparatus which provides a heated wash fluid to a cleanable surface, and, still more specifically, to a heated wash fluid apparatus for a vehicle windshield wash system.

It is necessary in many diverse applications to quickly elevate the temperature of a fluid to a higher use temperature. For example, it is desirable to be able to provide instant hot water, for use in homes, offices and campers, as well as for industrial processes.

In cleaning applications, it is known that hot fluid removes dirt and other debris from a surface much better and much faster than colder fluids. One heated fluid application is a vehicle wash fluid system, such as a windshield wash system as well as vehicle wash systems applied to camera lenses, exterior lamps and lamp lenses, mirrors, etc. Vehicles are typically provided with at least one and usually multiple windshield washers which are used to clear the field of vision in a windshield or rear backlight.

Typically, a nozzle or spray device is provided adjacently to or as part of the windshield wiper to disperse a pattern of wash fluid onto the windshield prior to and during the wiping operation to improve the efficiency of the wiping operation so as to provide a clear field of vision for the driver or vehicle passengers. The wash fluid is typically stored in a reservoir in the engine compartment and is pumped through the spray device upon manual activation of a control actuator by the vehicle driver.

Since it is known that warm or heated fluid provides better cleaning efficiency than cold fluid, it is also known to provide a heated wash fluid to a vehicle window spray device. Conventional thought would be that the higher the temperature, the better the cleaning results. However, this may not be the case, since the presence of certain elevated fluid temperature levels may create significant problems.

Safety to humans is paramount in all product designs. It is believed that fluid temperatures in excess of 70° C. can cause significant skin damage with very limited exposure. Therefore, while a fluid temperature profile higher than 70° C. may be beneficial for cleaning and defrost performance, it is counterproductive for the safety of the human user.

Protection of other devices and/or fluid wash components is also a consideration. Many components in a vehicle fluid washer system and other components on the vehicle that may be exposed to the fluid from the washer system are made of materials that may be damaged by fluid temperatures that may exceed 70° C. Again, while cleaning performance at these temperature levels may be improved, it would be inappropriate to damage the washer system and other vehicle components and subsystems, such as hoses, hose fittings, check valves, blades, glass surfaces and, particularly, glass surfaces with cracks or chips, etc.

In addition, windshield washer fluid is often made up of volatile fluids, the most common of which is alcohol. Alcohol in a water mixture is relatively safe except when the temperature is high enough to boil the alcohol from the solution. If the fluid temperature reaches the boiling point, the alcohol can be driven from the solution, which greatly diminishes the effectiveness of the washer solution at lower temperatures. In addition, if the temperature is too high, it may actually result in a flash condition with the gaseous alcohol.

Windshield washer fluid also may contain detergent or other additives that may be sensitive to temperature. Elevated temperatures tend to cause some detergents to precipitate, with both situations being negative to the effectiveness of the washer fluid. Such conditions may also result in damage to downstream components since as washer nozzles by causing the washer nozzles to clog or be restricted by glycerin or paraffin residues. Some washer fluids now contain acrylic material which, after exposure to elevated temperatures above approximately 70° C., may cause the acrylic material to cure and plug the nozzle.

In many areas, consumers may use water exclusively or, in the case of European markets, tap water which is mixed with alcohol to create a windshield washer solution. In areas of very hard water, this can present a problem in a heated environment. While many factors contribute to the detrimental formations of calcium plaque, temperature is a key one. In elevated temperatures, this can generate a problem. The potential problem is exasperated by the function of the washer system as it operates. A pump pressurizes the system to push fluid through the delivery lines to a restrictive orifice at the nozzle. This can cause otherwise benign suspended colloidal calcium to impact and stick to the nozzles. In time, this can result in the nozzle becoming plugged.

Thus, it would be desirable to provide a fluid heater apparatus which provides a heated fluid control apparatus for maintaining the temperature of a cleaning fluid at an optimum efficiency level; while at the same time at a temperature level which is below threshold temperatures that could cause damage to the human user, etc.

SUMMARY

The present invention is a method controlling the temperature of a fluid as the fluid is discharged from a fluid heater apparatus.

The inventive method includes the steps of:

establishing a fluid discharge temperature range between first and second temperatures;

providing heating means to supply thermal energy to the fluid;

measuring the temperature of the fluid; and in response to the measured temperature, controlling activation of the heating means to maintain the temperature of the fluid within the fluid discharge temperature range.

In one aspect, the first temperature is defined as the high temperature of the temperature range and the second temperature is defined as the low temperature.

In another aspect, the heater elements are independently controllable to maintain the fluid temperature within the temperature range.

In another aspect, the invention is embodied in an apparatus for heating fluid. The apparatus includes an enclosure having a flow path extending therethrough for the passage of fluid through the enclosure. Heating means are provided to supply thermal energy to the fluid in the fluid flow path in the body. Means are provided for sensing the temperature in the body. Control means are responsive to the output of the temperature sensing means for controlling the activation of the heating means to maintain the temperature of the fluid in the body within a predefined discharge temperature range.

In another aspect, the present invention is a wash apparatus including a fluid reservoir contain a wash fluid, a pump coupled to the fluid reservoir for pumping fluid from the reservoir, a spray nozzle fluidically coupled to the pump for discharging fluid pumped from the reservoir onto a cleanable surface, and a heater apparatus disposed in fluid flow communication between the pump, the reservoir and the nozzle.

The fluid heater temperature control apparatus and method of the present invention provide accurate control of the temperature of a fluid discharge from a fluid heater apparatus within a predefined and desired discharge temperature range. The discharge temperature range is established to minimize injury to humans and damage to vehicle components which may be contacted by the discharged heated fluid.

The inventive method and apparatus can be effectively implemented via a controller which can independently control the activation of a plurality of heater elements so as to provide heated fluid within the predefined temperature range for a considerable discharge time period.

The heater apparatus includes an enclosure, a fluid flow path through the enclosure, heating means for supplying thermal energy to the fluid in the fluid flow path, temperature sensing means for sensing the temperature in the fluid, and control means, responsive to the temperature sensing means, for controlling the activation of the heating means to maintain the temperature of the fluid in the body within a predefined discharge temperature range.

BRIEF DESCRIPTION OF THE DRAWING

The various features, advantages and other uses of the present invention will become more apparent by referring to the following detail description and drawing in which.

DETAILED DESCRIPTION

Figure 1:
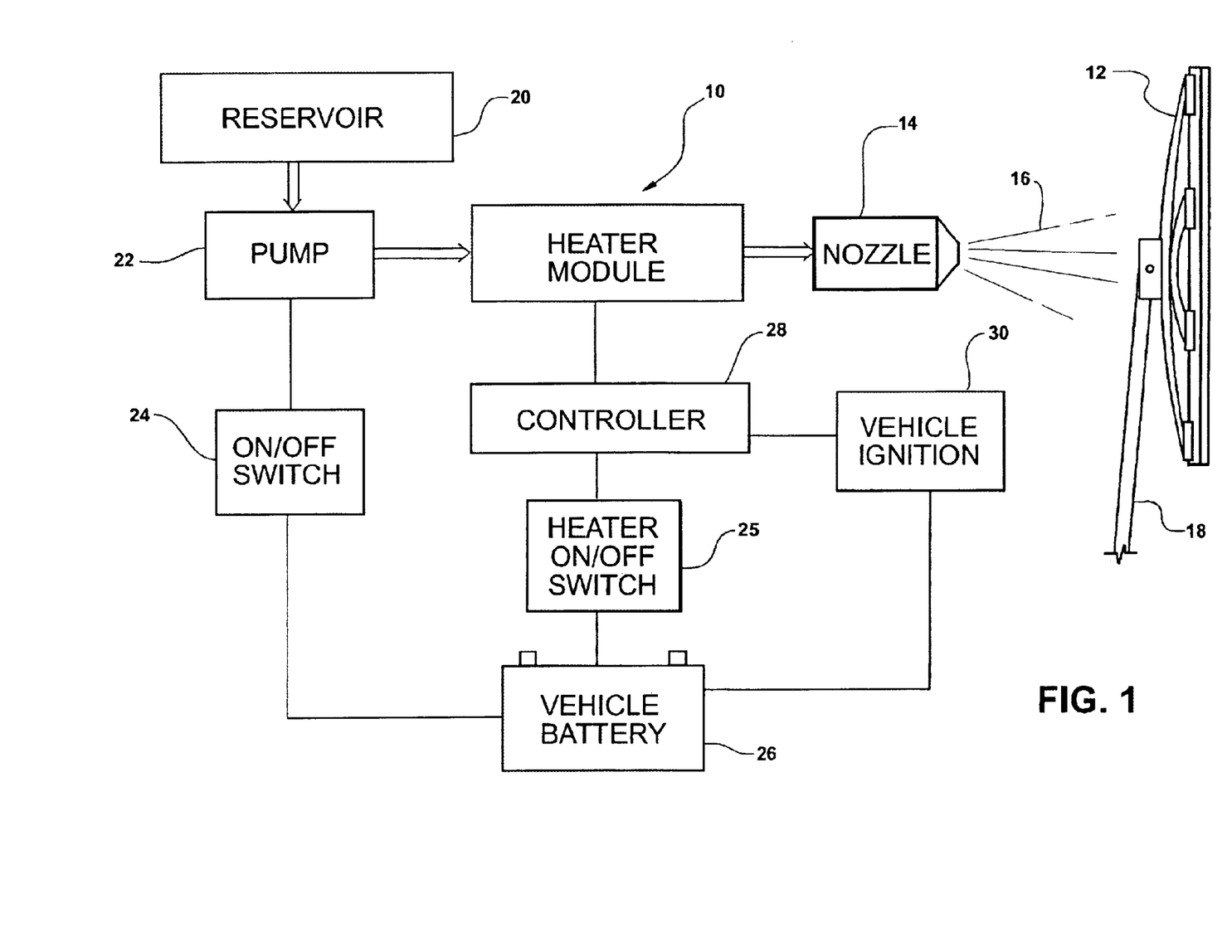
FIG. 1 is a block system diagram of a fluid heater apparatus according to the present invention used in an exemplary vehicle window wash fluid delivery system.
Figure 2:
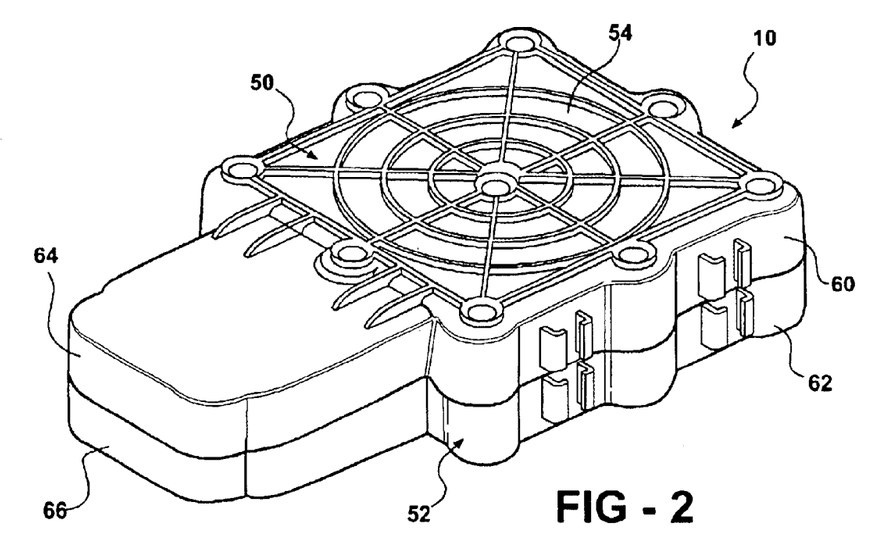
FIG. 2 is a perspective view of a heater module according to one aspect of the present invention.

Referring now to FIG. 1, there is depicted an environment in which a heater apparatus or module 10 constructed in accordance with the teachings of the present invention can be advantageously utilized. Although the following use of the heater module 10 of the present invention is described in conjunction with a vehicle window wash system, it will be understood that the present heater module may be employed in other applications requiring heated fluid, such as any cleaning system used to clean any vehicle window, i.e., the windshield, rear backlight, or side windows, as well as cleaning systems for other vehicle surfaces such as mirrors, camera, lenses, sensor covers, etc.

As is conventional, a vehicle window 12, such as a windshield, rear backlight or window, etc., has one or more fluid delivery devices, such as spray nozzles 14 located in a position to dispense or spray a pattern 16 of wash fluid onto the exterior surface of the window 12. The dispersion of the wash fluid 16 is usually in conjunction with activation of a windshield wiper 18 over the window 12.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is suppled with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as 70° C., by example only, by the heater module 10. A suitable control circuit or controller 28 is provided for controlling the operation of the heater elements in the heater module 10. The controller 28 is also supplied with electric power from the vehicle battery 26. The controller 28 is activated by a "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

Referring now to FIGS. 2–9, there is depicted one aspect of the heater module 10 according to the present invention.

It will be understood that the following description of a heater module which uses heater elements embedded in a thermally conductive mass through which a fluid flow path extends is only one example of a heater apparatus which is capable of advantageously using the fluid heater control temperature control of the present invention. For example, fluid heaters employing heater elements mounted in direct or semi-direct contact with a supply or flow of fluid can also employ the features of the present invention.

The heater module 10 includes a heat exchange mass or body 40 formed of a suitable highly thermally conductive material. Although the mass 40 is described as being formed of diecast, molded or machined aluminum, other materials, either homogenous or non-homogenous, may also be employed. For example, the mass 40 can be formed of alumina particles, ceramic materials, etc.

The mass 40, as described in greater detail hereafter, includes a fluid flow path between an inlet 42 and an outlet 44. The inlet and outlet 42 and 44, respectively, receive a fitting 46 and an outer sleeve 48 which are joined together for receiving a fluid sealed connection to a fluid flow conduit, element or tube, not shown. The inlet 42 will be connected to receive the pump output from the window wash fluid reservoir 20; while the outlet 44 will be connected to the spray nozzle(s) 14.

As vehicles typically have several spray nozzles 14, usually one for each of the two windshield wipers, and at least one nozzle 14 for the rear backlight or rear window wiper, it will be understood that the following description of a single heater module 10 for heating all of the fluid discharge from the fluid reservoir 20 will encompass multiple parallel paths, each containing a separate heater module, for heating fluid from the reservoir 20 for each different nozzle 14.

The heat exchange mass 40 is disposed within an insulated enclosure formed by a first cover 50 and a mating second cover 52. The first and second covers 50 and 52 have complementary shapes with a major wall surface 54 and 56, respectively, and a surrounding peripheral lip 60 and 62, respectively.

A necked-down end portion 64 and 66 is formed in each of the first and covers 50 and 52, and forms an extension from one end of the respective major walls 54 and 56 as well as from the peripheral edge lips 60 and 62. The necked-down portions 64 and 66, when joined together, form an end cavity for receiving a connector assembly 70 which connects electrical conductors to the heating element(s) mounted in the joined first and second covers 50 and 52.

The first and second covers 50 and 52 and the heat exchange mass 40 are fixedly joined together, after the connector assembly 70 has been disposed in the extensions 64 and 66 of the first and second covers 50 and 52 by suitable means, such as by heat stake rivets or projections 76 projecting outwardly from opposite major surfaces of the heat exchange mass 40. The projections 76 engage apertures in the major surfaces 60 and 62 of the first and second housing parts 50 and 52 and are heat welded together to join the first and second housing parts 50 and 52 together in a fixed connection.

Figure 3:
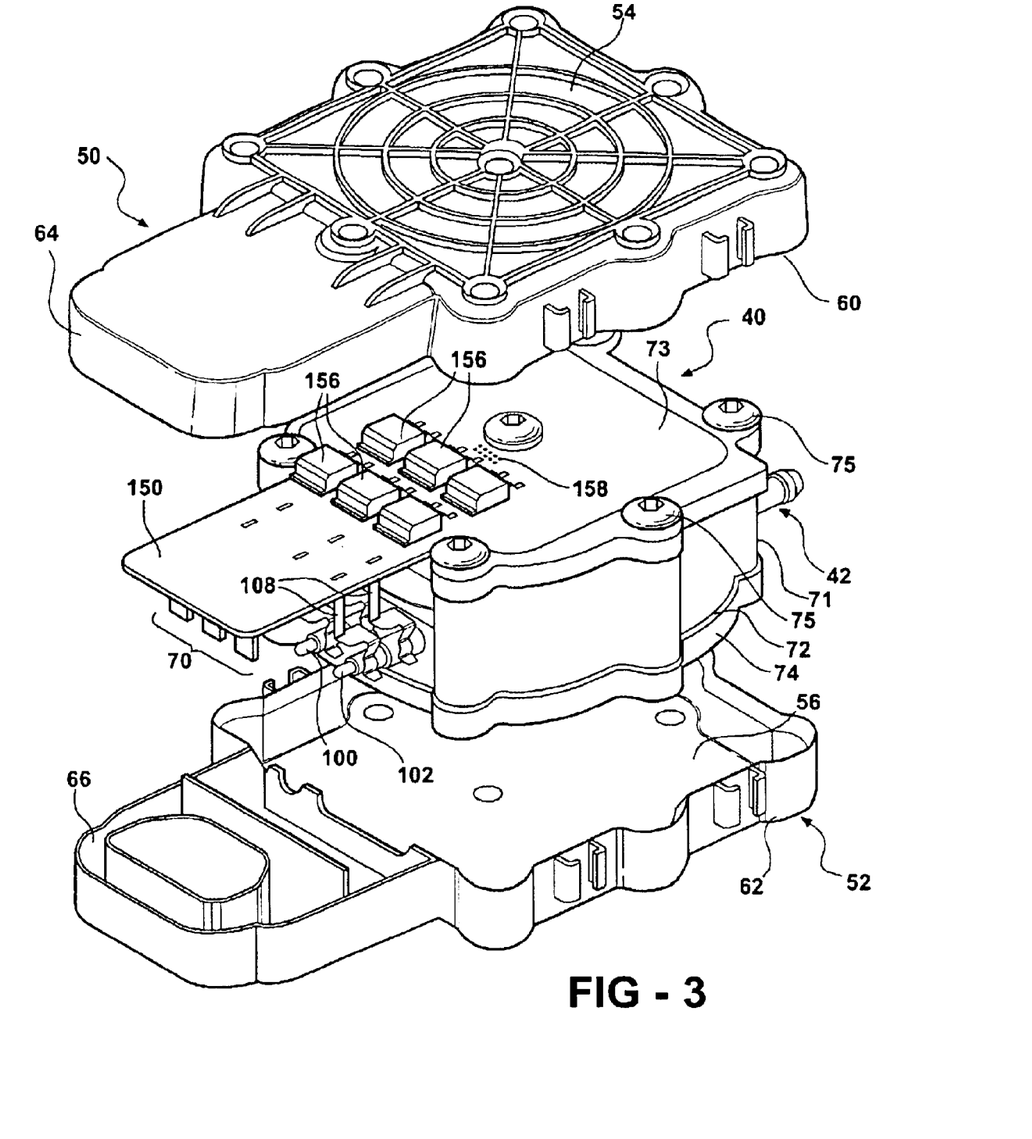
FIG. 3 is an exploded perspective view of the heater module shown in FIG. 2.

A pair of seal elements 71 and 72, each having a peripheral shape substantially the same as the peripheral shape of the heat exchange mass 40 is disposed on opposite surfaces of the heat exchange mass 40 as shown in FIG. 3. The seal members 71 and 72 are formed of a high thermal resistant, insulating material. The seal members 71 and 72 seal the open ends of the flow paths through the heat exchange mass 40 as described hereafter.

Upper and lower plates 73 and 74, each also having a shape complimentary to the shape of the heat exchange mass 40, are disposed in contact with the upper and lower seals 71 and 72, respectively, and fixed thereto by suitable fastening means, such as nuts and bolts 75 which extend through apertures in each of the upper and lower plates 73 and 74, the upper and lower seals 71 and 72 and the heat exchange mass 40. The upper and lower plates 73 and 74 are formed of a good thermal conductive material, such as aluminum.

As shown in detail in FIGS. 4–7, the heat exchange mass 40 has a solid cubical shape formed of a first major surface 80, a second opposed major surface 82, and four sidewalls 84, 86, 88 and 90, interconnecting the first and second surfaces 80 and 82.

A plurality of bores 92, 94, 96 and 98 are formed in the body 40 and project inwardly from the sidewall 84. The bores 92, 94, 96 and 98 are each adapted for receiving one generally cylindrical heater element. As partially shown in FIG. 4, each bore, such as bores 96 and 98, extend through the solid central portion of the mass 40 so as to be completely surrounded by the solid material of the mass 40. This defines the mass 40 as a heat source after receiving heat from activation of the heater elements describe hereafter.

In the aspect of the invention shown in FIGS. 4–7, the heater elements are formed of "calrod". Although different materials may be used, one example of a calrod construction is a Nichrome wire inside of a stainless steel sheath.

Figure 4:
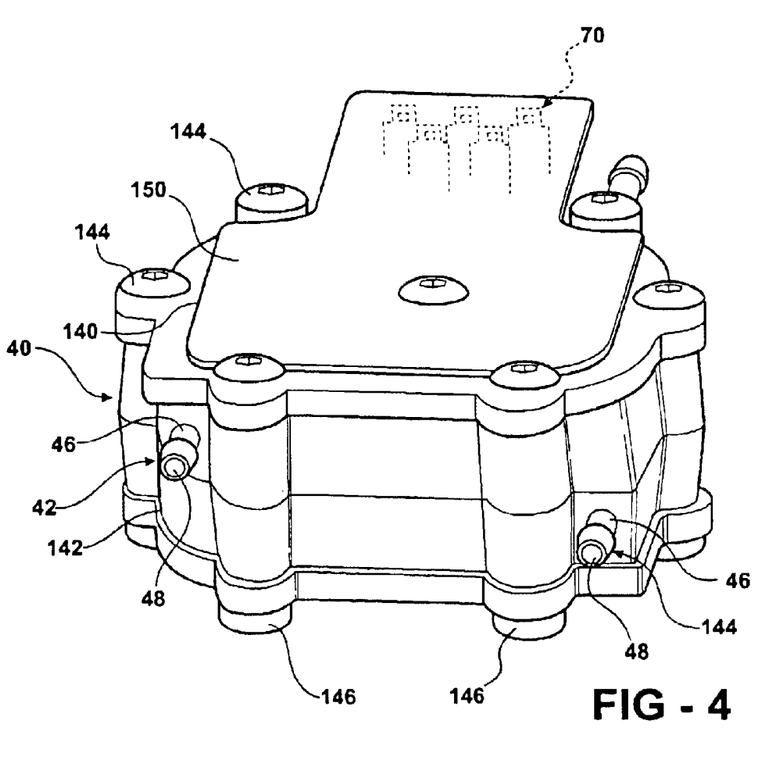
FIG. 4 is a perspective view, taken from the right side of FIG. 3, of the heater module of the present invention.
Figure 5:
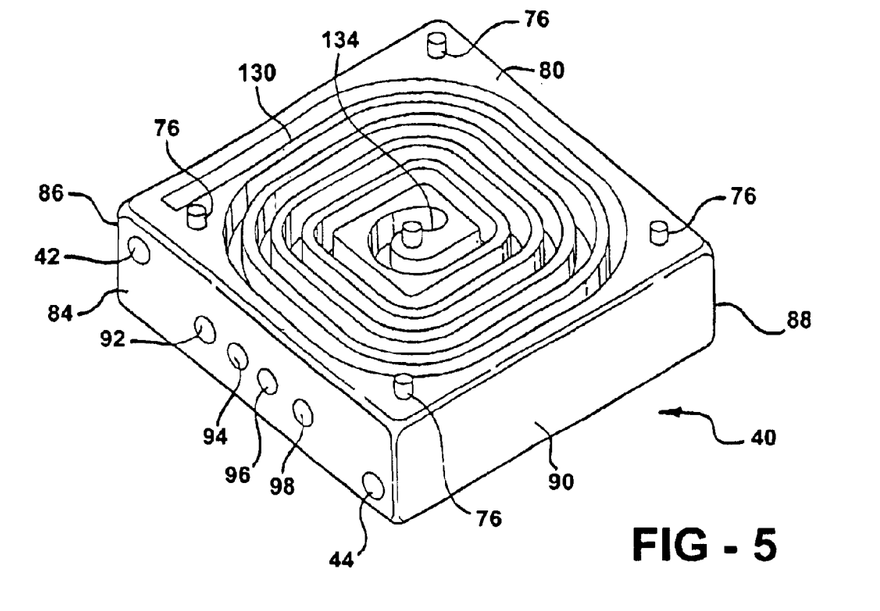
FIG. 5 is a top perspective view of the heater module thermal mass.

By way of example only, at least one and preferably a plurality, i.e., two or three or more individual heater elements 100, 102 and 103, with only heater elements 100, 102 being shown in FIG. 4, are disposed in the bores 96, 94 and 98. The function of the one or more heater elements, such as heater elements 100 and 102, will be described hereafter in conjunction with the description of the heater module 10.

Figure 7:
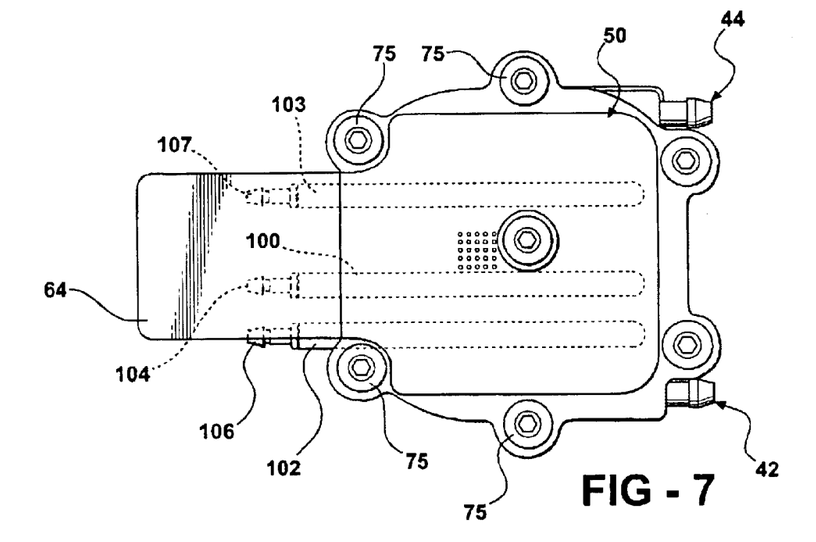
FIG. 7 is a plan view of the interior of the heater module shown in FIG. 4.

As seen in FIGS. 4 and 7, one end 104, 106 and 107 of each heater element, elements 100, 102 and 103, respectively, projects outwardly through the sidewall 84 of the body 40. The ends 104, 106 and 107 of the heater elements 100, 102 and 103 respectively, engage individual terminals 108 extending from a printed circuit board 150 mounted by means of fasteners, adhesives, etc., to an exterior surface of the upper plate 73. Conductive traces in the printed circuit board connect the terminals 108 with the connector terminals 70 to receive power from the vehicle electrical system.

The circuit board 150 is fixedly mounted by suitable fasteners such as screws. One of the terminals 108 acts as a ground lead in that an end portion is disposed in contact with the outer stainless steel sheath of each heater element or calrod 100, 102 and 103. Another of the terminals 108 is the power lead for calrod 100. This terminal 108 provides electric power to the calrod 100 through contact with the end 104 of heater element 100 in the grid assembly 110.

The other two terminals 108 provide power connections to the other two heater elements 102 and 103. A switch, not shown, may be interposed between the terminal 108 and the other two terminals 108 to selectively provide power to the other two terminals 108 when power is supplied to the power terminal. This switch can be a bi-metal switch, for example, which will open at a predetermined temperature, such as 50° C., as described hereafter. Alternately, a switch controlled by the circuitry on the circuit board 150 of the controller 28 will selectively connect power from the power terminal 108 to the other terminals 108. This provides the controller 28 with the capability, when receiving suitable external input signals from the vehicle body controller, for example, to deactivate the heater module 10, during the occurrence of low vehicle battery power, a thermal event, etc.

As shown in FIGS. 4–7, the thermally conductive mass 40 includes a fluid flow channel or path which extends from the inlet 42 to the outlet 44. The fluid flow path has a labyrinthian path formed of a first fluid flow path portion 130 and a second fluid flow path or channel 132 which are connected at a generally centrally disposed bore 134. The first fluid flow channel 130 has a generally spiral shape formed of alternating straight and arcuate sections which alternate creating laminar and turbulent flow of the fluid passing through the first flow channel 130 to maximize the heat absorption of the fluid from the adjoining walls of the mass 40. Further, the first fluid flow channel 130 has an inward directed spiral shape from the inlet 42 to the bore 134 to minimize temperature differential between adjoining portions of the spiral shaped first flow channel 130.

Figure 6:
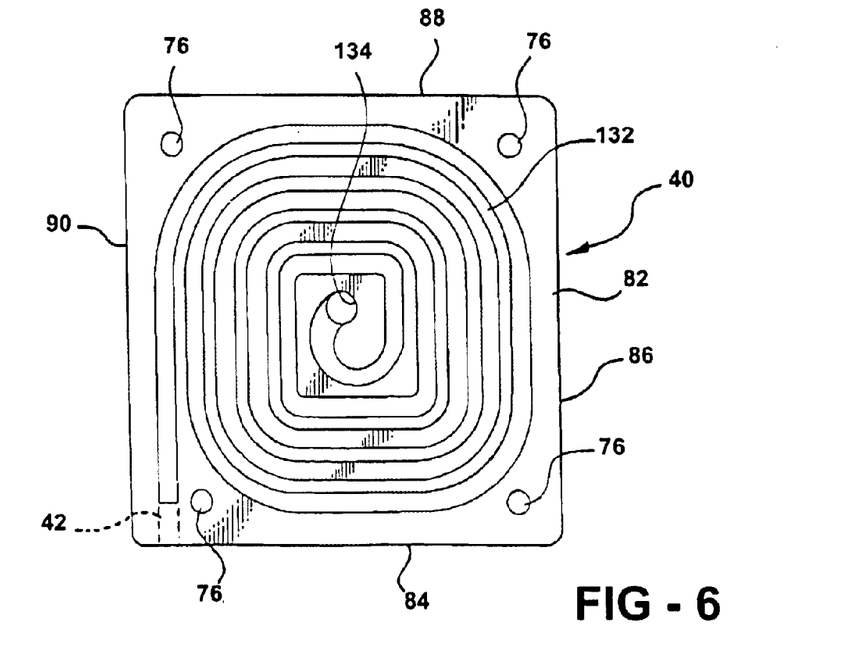
FIG. 6 is a bottom elevational view of the heater module thermal mass shown in FIG. 5.

As shown in FIG. 6, the second fluid flow channel 132 has a substantially identical spiral shape. However, fluid flow through the second fluid flow channel 132 is in an outward spiral direction from the bore 134 to the outlet 44. As described above, the seal members 71 and 72 sealingly close the open ends of the first and second fluid flow channels 130 and 132.

Thus, fluid flow through the first and second flow channels 130 and 132 starts from the inlet 44 then continues in a spirally inward directed manner through the first flow channel 130 to the central passage or bore 134. Upon exiting the central passage 134 into the second flow channel 132, fluid flow progresses in an outward spiral direction through the second flow channel 132 to the outlet 44.

In operation, the heater module 40 will be interconnected in the vehicle wash fluid flow lines between the pump 22 and the spray nozzle(s) 14 as shown in FIG. 1. The external connector is then connected to the connector housing 70 to provide electric power from the vehicle battery 26 and the controller 28 to the heater elements 100, 102 and 103, in the heat exchange body 40.

Assuming that the first and second fluid flow channels 130 and 132 in the body 40 are filled with fluid, when the controller 28 activates the heater elements 100, 102 and 103, the heater elements 100, 102 and 103 will begin radiating heat which will immediately raise the temperature of the entire surrounding portion of the heat exchange body 40. Heat from the body 40 will, in turn, be radiated to and absorbed by the fluid disposed in the first and second flow channels 130 and 132.

The straight and arcuate portions of the first and second fluid flow channels 130 and 132 create alternating turbulent and laminar flow regions in the fluid flowing through the mass 40 which causes movement of the fluid in the first and second flow channels 130 and 132 bringing all molecules in the fluid in contact with the wall of the body 40 forming the first and second flow channels 130 and 132 to efficiently absorb the maximum amount of heat possible. This causes the temperature of the fluid to be quickly raised from ambient temperature at the inlet 42 to approximately 70° C. at the outlet 44 in approximately sixty seconds.

The fluid in the first and second fluid flow channels 130 and 132 removes or absorbs heat from the thermal mass 40 thereby increasing the fluid temperature by physical contact with the mass 40. The heater elements 100, 102 and 103 maintain the heat of the thermal mass 40 at a predetermined temperature thereby preventing hot spots from occurring in the fluid. Normally, hot spots would occur when the fluid comes in direct contact the heater elements 100, 102 and 103. Fluid which is not in physical contact with the heater elements 100, 102 and 103 passes the heater elements 100, 102 and 103 by and does not absorb heat. By heating the thermal mass 40, the physical hot contact area is increased along with an increase in heat transfer efficiency. This requires less energy to heat the same volume of fluid. The elimination of the direct contact between the fluid and the heating elements eliminates flash conditions, reduces formation of calcium plaque and maintains efficiency over useful life.

Although the controller 28 can provide separate switchable signals to each of the heater elements 100, 102 and 103, in order to control each heater element 100, 102 and 103 separately under program or logic control, one simple approach includes the bi-metal element or a switch mounted between the power connections to one terminal 108 and each of the other terminals 108 connected to the additional heater elements 102 and 103. The bi-metal element can be set to open at a predetermined temperature, such as 50° C., thereby deactivating the associated heater element. This enables the additional heater elements 102 and 103, for example, to remain deactivated until a high heat requirement is initiated.

The fasteners 75 also fix the printed circuit board 150 which forms part of the controller 28 onto the heat exchange body 40, typically over the first plate 140.

Although the following description of the use of high amperage switching devices known as MOSFETs, as part of the controller 28 to provide the necessary high current, typically 50 amps at 12 volts, to the heating elements 104, 106 and 107 in the thermal mass 40, other high amperage switching devices may also be employed. Any number of MOSFETs 156 can be mounted in any configuration on the printed circuit board 150.

A plurality of bores 158 are optionally formed through the printed circuit board 150. The bores 158 improve heat flow between the switching devices on the printed circuit board (PCB) 150 and the underlying first plate 73.

A temperature sensor 159, such as a PTC, is mounted on the printed circuit board 150, typically over or adjacent to the bores 158. The temperature sensor 159 measures the temperature of the printed circuit board 150 and provides a temperature proportional signal to the controller 28 which is used by the controller 28 to control the on/off cycle of the heating elements 104, 106 and 107.

Figure 8:
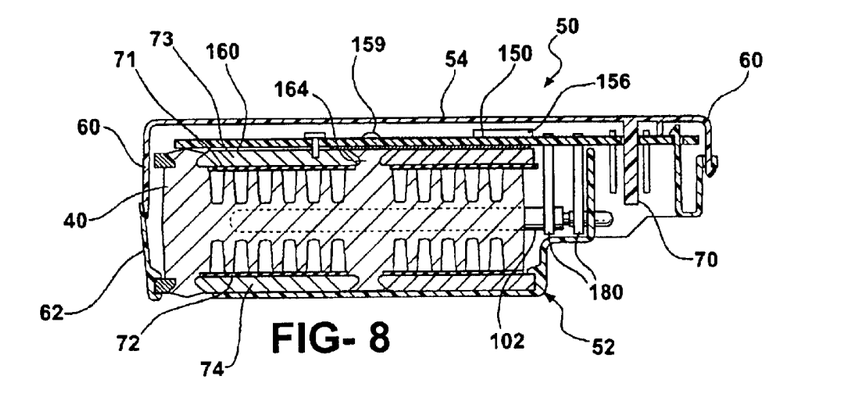
FIG. 8 is a longitudinal, cross-sectional view of the heater module shown in FIGS. 2–7.
Figure 9:
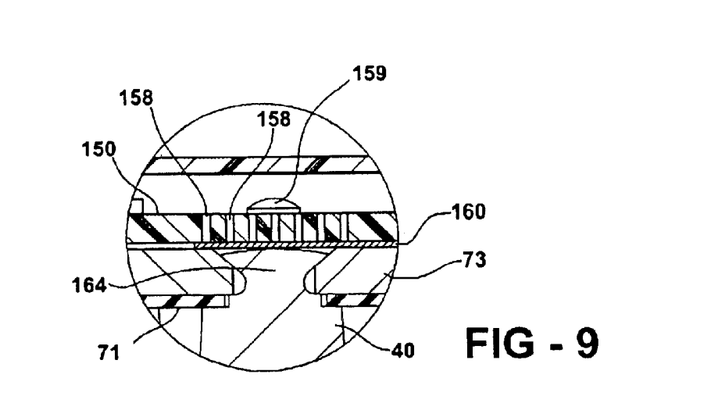
FIG. 9 is an enlarged, side cross-sectional view of a portion of the heater module shown in FIG. 8.

To further enhance transfer of the heat generated by the MOSFETs 156 to the first plate 140, a highly conductive pad or plate 160, hereafter referred to as a sill pad 160, is interposed in contact between the printed circuit board 150 and the first plate 23 as shown in FIGS. 3, 8 and 9. The sill pad 160 typically has a planar shape and dimensions to extend over at least a portion of the first plate 73. The pad 160 isolates stray electrical currents to negative ground through the screws 75, provides a positive contact between the MOSFETs and the thermal mass 40, and stabilizes heat loss through the adjacent cover by maintaining the temperature of the plate 73 at a higher temperature to thereby create a lower temperature differential or gradient with respect to the thermal mass 40.

As shown in FIG. 9, a projection extends from the thermal mass 40.

The sill pad 160 preferably has a higher thermal conductivity than the thermal conductivity of the plate 73 to efficiently draw heat generated by the MOSFETs 156 to the plate 73 thereby maintaining the temperature of the plate 73 at an elevated temperature. This elevated temperature of the plate 73 is higher than the normal temperature of the plate 73 caused by heat escaping from the sides of the thermal mass 40 around the seals 71 and 72.

The projection 164 and the thermal mass 40 engage apertures in the plate 73 as shown in FIGS. 8 and 9. A portion of the sill pad 160 extends over one of the projection 164 as shown in FIG. 9 and may be disposed in contact or registry with the projection 164 to provide a direct heat exchange path from the thermal mass 40 to the sill pad 160.

Although a single heater element 100 may be employed as the heat source in the body 40, multiple heater elements, with two or three heater elements, 100, 102 and 103, being described by way of example only, have been found to be more advantageous. The controller 28 can activate all of the plurality of heater elements 100. 102 and 103 upon receiving a first command to dispense heated wash fluid onto the windshield 12. This generates a maximum amount of heat to the body 40 to immediately and quickly raise the temperature of the body 40 high enough to transfer sufficient heat to the fluid in the fluid flow channels 130 and 132 to raise the temperature of the fluid to the desired discharge temperature of 65° to about 70° C. The multiple heater elements 100, 102 and 103 can remain in an activated state by the controller 28 if immediate and successive commands from the on/off switch 24 are supplied by the vehicle driver to supply additional charges of fluid onto the windshield 12.

At the completion of the fluid dispensing operation, and during other periods of non-fluid dispensing while the vehicle engine is running, or the engine is running and a dashboard mounted switch, for is activated, the controller 28 can cyclically activate one or more of the heater elements, such as heater element 100, to maintain the temperature of the fluid in the first and second flow channels 130 and 132 at an elevated temperature for immediate discharge onto the windshield 12 when activated by the on/off switch 24. This minimizes electrical power requirements on the vehicle battery 26.

Figure 10:
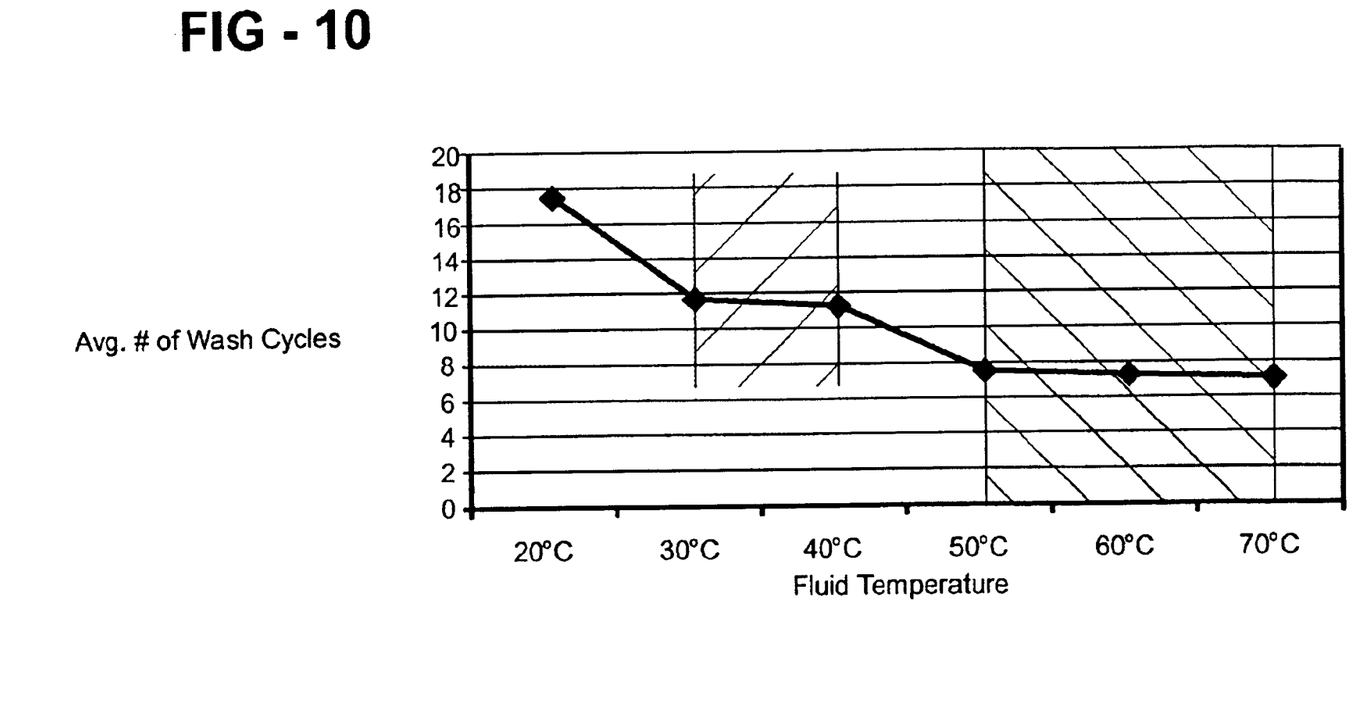
FIG. 10 is a graph depicting the control concept of the present invention.

Referring now to FIG. 10, there is depicted a graph of cleaning performance based on a number of effective cleaning cycles over varying temperatures. Applicants' have uniquely discovered that plotting cleaning performance in terms of the number of effective cleaning cycles versus temperature results in the location of distinct temperature plateaus where optimum cleaning performance can take place over the fewest number of cleaning cycles. These plateaus appear in the 30°–40° C. range and about 50° C. to about 70° C., with the about 50°–70° C. range providing optimum cleaning performance over the longest number of cleaning cycles.

In preparing the test results shown in FIG. 10, the washer fluid was 100% water. A wash cycle is defined as two wet wipe cycles of the vehicle windshield wipers followed by three dry wipes. A window was considered "clean" when all grim and/or spots were removed and wipe quality was high.

The fluid temperature depicted in FIG. 10 is the temperature measured in the heater module itself The actual temperature of the fluid at the windshield could be lower.

As shown in FIG. 10, throughout the temperature range between 50° C. and about 70° C., the average number of wash cycles to obtain a clean window or surface remains constant at about eight cycles. Thus, maintaining the temperature of fluid heated by the heater module of the present invention continuously within the defined temperature between the high first temperature of about 70° C. and the second lower temperature of about 50° C. ensures that the window will be clean in the optimum fewest number of cycles thereby minimizing power and fluid requirements.

As discussed above, fluid temperatures over 70° C. can be harmful to humans, as well as providing a deterioration of vehicle wash system components and surrounding vehicle components exposed to the heated fluid, such as the vehicle windows, surrounding painted surfaces, wiper blades, wiper arms, etc.

Thus, the unique control apparatus of the present invention effectively maintains the temperature of the heated fluid discharge from the fluid heater apparatus 10 within a defined temperature range, such as about 50° C. to about 70° C. The graph shown in FIG. 10 for a 100% water solution also applies to a water/alcohol mix with the graph of such water/alcohol mix substantially tracking the profile in FIG. 10, but slightly offset therefrom.

Figure 11:
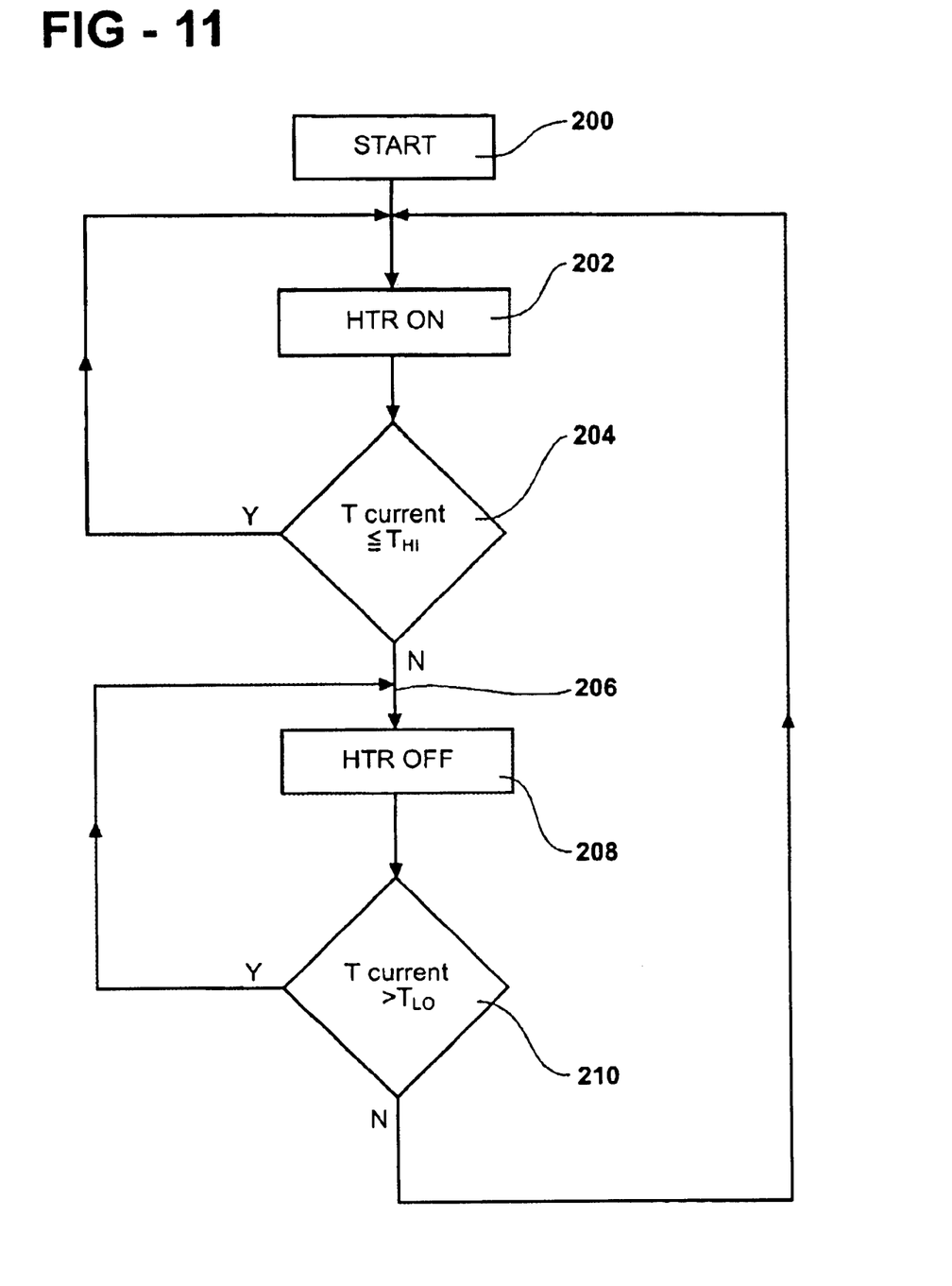
FIG. 11 is a flow chart depicting the control sequence of the present invention.

FIG. 11 depicts the control sequence of the present invention in which when a start command in step 200 is given by the user pressing a button in the vehicle, for example, which causes the control 28 to generate signals to the heating means in step 202. As described the above, the heating means may comprise one or more separate heater elements, all of which can be turned "on" simultaneously, to provide high power and heating at the beginning of the heating cycle, with one or more of the plurality of heater elements being switched off as the temperature reaches the defined fluid discharge temperature range.

The controller 28 continually senses the temperature of the fluid heater apparatus, either through a temperature sensor in the fluid flow path or one on or adjacent to the thermal mass 50 and compares the measured temperature with a desired or preset temperature in step 204. As long as the measured temperature is less than a temperature within the temperature range shown in FIG. 10, the controller 28 will maintain the heater elements in an "on" condition.

Only when the measured temperature is detected as being withing the preset temperature range, as indicated by a no-decision 206 from the comparison step in 204, the controller 28 turns all of the heater means "off" in step 208. However, the controller 28 continues to compare the measured temperature with the preset temperature range defined above in step 210 and, when the measured temperature falls outside of the temperature range, such as below the lowermost temperature, the controller 28 will return to step 202 and turn the heater means back "on" so as to maintain the temperature of the heated fluid within the predetermined temperature range for optimum cleaning performance while providing the desired safety to the vehicle components and the human user.

Thus, there has been disclosed a unique fluid heater control apparatus which uniquely maintains the temperature of a heated fluid within a defined temperature range for optimum cleaning performance for the longest number of cleaning cycles, safety to the human user, and less damage to vehicle components. The control apparatus can be implemented with practically any type of fluid heater so as to increase the number of applications in which the present invention can be advantageously employed. Further, the control apparatus is implemented without requiring additional or components for a low application cost.

What is claimed is:

1. A method for heating fluid in a vehicle surface wash fluid delivery apparatus comprising the steps of:

establishing a predefined fluid discharge temperature range between first about 50° C. and about 70° C.;

providing heating means to supply thermal energy to fluid;

measuring the temperature of the fluid; and in response to the measured temperature, controlling activation of the heating means to maintain the temperature of the fluid within the temperature range.

2. The method of claim 1 wherein the step of providing heating means further comprises the step of:

providing the heating means as a plurality of discrete heater elements; and independently controlling activation of each of the heater elements.

3. The method of claim 2 wherein the step of maintaining the temperature of the fluid within the temperature range further comprises the step of:

independent controlling as least two of the heater elements.

4. An apparatus for heating fluid in a vehicle surface wash fluid delivery apparatus comprising:

an enclosure;

a fluid flow path extending through the enclosure for the passage of fluid through the enclosure;

heating means for supplying thermal energy to the fluid in the fluid flow path in the enclosure;

means for sensing the temperature of the fluid in the enclosure; and control means, responsive to the temperature sensing means, for controlling the activation of the heating means to maintain the temperature of the fluid in the within a predefined discharge temperature range of about 50° C. to about 70° C.

5. The apparatus of claim 4 wherein the heating means comprises:
    a plurality of discrete heater elements, at least certain of the heater elements being independently controllable.

6. A vehicle surface wash apparatus comprising:
    a fluid reservoir for containing a wash fluid;
    a pump coupled to the fluid reservoir for pumping fluid from the reservoir;
    a spray nozzle fluidically coupled to the pump for discharging fluid onto a cleanable surface; and
    a heater apparatus disposed in fluid flow communication between the pump and the spray nozzle, the heater apparatus including:
    an enclosure;
    a fluid flow path extending through the enclosure for the passage of fluid through the enclosure;
    heating means for supplying thermal energy to the fluid in the fluid flow path in the body enclosure;
    means for sensing the temperature of the fluid in the enclosure; and
    control means, responsive to the temperature sensing means, for controlling the activation of the heating means to maintain the temperature of the fluid in the enclosure within a predefined discharge temperature range of about 50° C. to about 70° C.

7. An apparatus for heating fluid in a vehicle surface wash fluid delivery apparatus comprising:
    means for establishing a predefined fluid discharge temperature range between about 50° C. and about 70° C.;
    means for providing heating means to supply thermal energy to fluid;
    means for measuring the temperature of the fluid; and
    means, responsive to the measured temperature, for controlling activation of the heating means to maintain the temperature of the fluid within the temperature range.

8. An apparatus for heating fluid in a vehicle surface wash fluid delivery apparatus comprising:
    means for establishing a predefined minimum fluid discharge temperature of about 50° C.;
    means for providing heating means to supply thermal energy to fluid;
    means for measuring the temperature of the fluid; and
    means, responsive to the measured temperature; for controlling activation of the heating means to maintain the temperature of the fluid at or above the minimum fluid discharge temperature.

9. An apparatus for heating fluid in a vehicle surface wash fluid delivery apparatus comprising:
    means for establishing a predefined maximum fluid discharge temperature of about 70° C.;
    means for providing heating means to supply thermal energy to fluid;
    means for measuring the temperature of the fluid; and
    means, responsive to the measured temperature, for controlling activation of the heating means to maintain the temperature of the fluid at or below the maximum fluid discharge temperature.

* * * * *